United States Patent Office 3,758,463
Patented Sept. 11, 1973

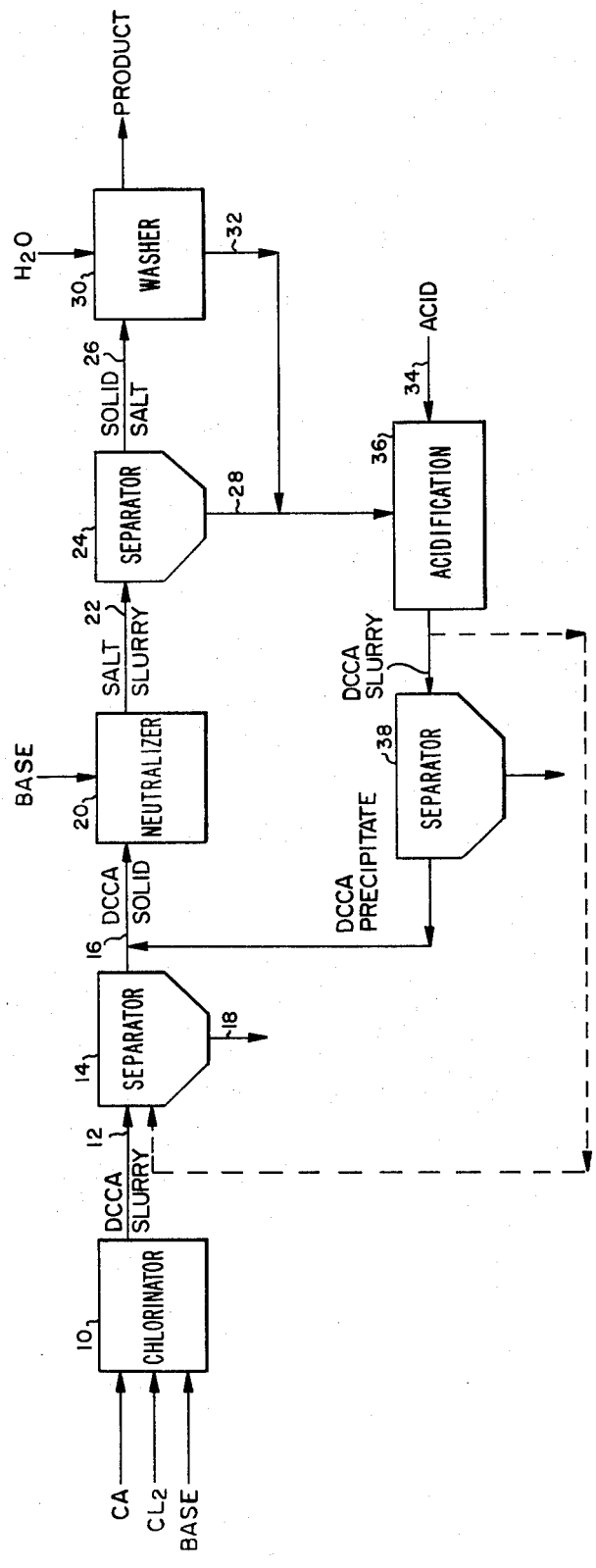

3,758,463
DICHLOROISOCYANURATE MANUFACTURE
Sidney Berkowitz, Highland Park, N.J., and Milton A. Cohen, Nitro, and Paul R. Yochum, South Charleston, W. Va., assignors to FMC Corporation, New York, N.Y.
Filed Dec. 29, 1970, Ser. No. 102,351
Int. Cl. C07d 55/40
U.S. Cl. 260—248 C          7 Claims

ABSTRACT OF THE DISCLOSURE

A process is provided for producing salts of dichloroisocyanuric acid from cyanuric acid, including the improvement of recovering dissolved salt of dichloroisocyanuric acid from a process mother liquor by acidification. Dichloroisocyanuric acid is produced from cyanuric acid, chlorine and a suitable base. The dichloroisocyanuric acid is neutralized to the salt, which results in formation of a precipitate of the salt of dichlorocyanuric acid and in an aqueous mother liquor containing dissolved salt. Washing of the precipitated salt results in additional mother liquor containing dissolved salt. The mother liquor is acidified with a strong acid by the improved process of this invention and the dissolved salt is recovered as dichloroisocyanuric acid precipitate.

BACKGROUND OF THE INVENTION

(A) Field of the invention

Dichloroisocyanuric acid compounds (also commonly known as dichlorocyanuric acid compounds, which term includes both the acid and its salts) are commercially produced chemicals having many known uses. This invention provides an improvement in a process for producing dichloroisocyanuric acid compounds from cyanuric acid, chlorine and a suitable base, by which the efficiency of the process is improved through the recovery of dichloroisocyanuric acid values from a process mother liquor containing a salt of dichloroisocyanuric acid without any adverse effects upon the chlorination step of the process.

(B) Description of the prior art

A useful process for producing dichloroisocyanuric acid involves a chlorination step in which cyanuric acid, chlorine and a suitable base are reacted. This chlorination step produces an aqueous slurry containing a dichloroisocyanuric acid. This slurry is separated into its liquid and solid components which are referred to as a liquid effluent and a solid effluent, respectively. The liquid effluent is discarded from the process. The solid effluent from the separation contains dichloroisocyanuric acid.

Salts of dichloroisocyanuric acid are a more desirable product than the acid and are produced by neutralizing the dichloroisocyanuric acid product with a suitable base such as sodium hydroxide or potassium hydroxide. Neutralizing the dichloroisocyanuric acid results in a dichloroisocyanurate slurry which is separated into supernatant liquid and solid dichloroisocyanurate. The supernatant liquid is an aqueous solution which is essentially saturated with dichloroisocyanurate. Dichloroisocyanurate, as used herein refers to the salts of dichloroisocyanuric acid whether in a solid crystals form or as ions in solution. The solid dichloroisocyanurate is usually washed with water, which washing results in an aqueous wash effluent containing dissolved dichloroisocyanurate. Subsequent processing of the solid dichloroisocyanurate may result in additional solution containing dissolved dichloroisocyanurate. The term "mother liquor" as used in this specification refers to an aqueous solution containing at least one dissolved dichloroisocyanurate. The mother liquor is usually the supernatant liquid in combination with other solutions containing dissolved dichloroisocyanurate such as the aqueous wash effluent.

Previously, the dissolved dichloroisocyanurate contained in the mother liquor was recovered by either recycling the mother liquor as an additional feed to the chlorination step or by reconverting the dichloroisocyanurate into cyanuric acid and chlorine by acidifying and steam stripping the mother liquor in a chlorine stripper and then recycling the cyanuric acid and chlorine back to the chlorination step.

Both the control of the products of chlorination and the efficiency of the chlorination step with respect to the utilization of the cyanuric acid feed are affected by pH and temperature during chlorination and especially by the base to cyanuric acid ratio being fed to the chlorination step.

The ratio of base to cyanuric acid in the feed to the chlorination step also affects the degree of chlorination of the cyanuric acid. For example, a feed ratio to the chlorination step of about 2.0 moles of sodium hydroxide to 1.0 mole of cyanuric acid along with sufficient chlorine results in the formation of dichloroisocyanuric acid. Lower feed ratios results in some unreacted cyanuric acid being present in the chlorination effluent while higher ratios (between about 2.0 and 3.0) result in contamination of dichloroisocyanuric acid with trichloroisocyanuric acid. Substantially uncontaminated dichloroisocyanuric acid, and the salts produced from it, are more valuable commercial products than dichloroisocyanuric acid compounds contaminated with cyanuric acid or trichloroisocyanuric acid. Because of the economic consideration, it is highly desirable to control the chlorination feed ratio of base to cyanuric acid in order to produce uncontaminated dichloroisocyanuric acid.

Recovering the dichloroisocyanurate which contains one sodium ion and one cyanuric acid equivalent dissolved in the mother liquor by recycling the "mother liquor" to the chlorination step caused serious problems with respect to process efficiency and control. The supernatant liquid from the neutralization of the dichloroisocyanuric acid is the main source of the mother liquor and the temperature of the mother liquor varies greatly due to the inherent difficulty in controlling the temperature of the aqueous slurry in conjunction with the exothermic chlorination reaction followed by the exothermic neutralization. The amount of the dichloroisocyanurate dissolved in the "mother liquor" varies greatly due to this temperature fluctuation of the mother liquor, and consequently the amount of the dichloroisocyanurate recycled in the mother liquor to the chlorination varies widely. The result of these variations is that the recycling of the mother liquor causes inherent instability in control of the feed ratio of cyanuric acid to base in the chlorination reaction, which decreases process efficiency and product quality.

Furthermore, the procedure of recycling the mother liquor restricts the amount of water that can be used for washing the solid dichloroisocyanurate after neutralization. During operation of the process with recycling of the mother liquor, the amount of water desired for washing the dichloroisocyanurate may be an amount that would result in large quantities of wash effluent containing dissolved dichloroisocyanurate and recycling this wash effluent results in excessive recycle quantities to the chlorination step. Therefore, operation of the process requires a choice between restricting the washing of the dichloroisocyanurate, excessive recycle quantities to the chlorination step or discarding some of the aqueous wash effluent containing dissolved product.

Because the chlorination reaction cannot be accurately controlled when recycling is practiced, the crystal size of the dichloroisocyanuric acid compound produced cannot be regulated and sometimes a sludge which is difficult to process is provided. Therefore, the process employing recycle of the mother liquor is incapable of consistently producing dichloroisocyanuric acid compounds having a crystal size range that has the highest commercial acceptance and value. In addition to greater value, larger crystal size makes separation of the solid from the liquid easier, especially by centrifugal methods and therefore simplifies processing of the product.

The other method previously used to recover the dichloroisocyanurate dissolved in the mother liquor was by stripping in a chlorine stripper utilizing steam and acid. The dichloroisocyanurate was recovered as its feed components, cyanuric acid and chlorine, which were recycled to the chlorination step. This steam stripping process, when operated commercially, was expensive and was plagued with process control problems and mechanical failures. In addition, the base equivalents contained in the dichloroisocyanurate were lost by this process using a chlorine stripping step.

SUMMARY OF THE INVENTION

We have now found that a process for producing dichloroisocyanuric acid compounds wherein cyanuric acid is chlorinated by reacting cyanuric acid, chlorine and a suitable base, and the chlorinated cyanuric acid is neutralized to produce a salt said process providing an aqueous mother liquor containing dissolved dichloroisocyanurate, can be improved to provide greater process control and recovery of reaction ingredients by acidifying the mother liquor with a concentrated strong acid thereby precipitating the dissolved dichloroisocyanurate values as dichloroisocyanuric acid and separating the dichloroisocyanuric acid precipitate from the mother liquor. The mother liquor is usually a supernatant liquid obtained from neutralizing the chlorinated cyanuric acid with a suitable base; however, subsequent washing or processing of the dichloroisocyanurate produced by the neutralization results in additional mother liquor.

BRIEF DESCRIPTION OF THE DRAWING

The figure is a schematic representation of our invention. It depicts a process for continuously producing chlorinated cyanuric acid compounds, which process incorporates the improvement of this invention.

DETAILED DESCRIPTION OF THE INVENTION

Dichloroisocyanuric acid compounds are produced by chlorinating cyanuric acid. A typical chlorination reaction for cyanuric acid is when dichloroisocyanuric acid is produced by reacting about 2.0 moles of a suitable base, about 1.0 mole of cyanurate acid and sufficient chlorine at a pH of about 3.0. The corresponding salt, termed a dichloroisocyanurate, can then be produced by neutralizing the acid.

Neutralization of dichloroisocyanuric acid produces an aqueous slurry containing the dichloroisocyanurate. This aqueous slurry is then separated into its liquid and solid components which are referred to as mother liquor and precipitated dichloroisocyanurate, respectively. The mother liquor obtained from the aqueous slurry is essentially saturated with dissolved dichloroisocyanurate, however the solubility and therefore the amount of dichloroisocyanurate in the mother liquor varies tremendously with temperature. During normal commercial operation, the temperature of this mother liquor leaving the separator can vary between 0° C. and 30° C. When the salt is sodium dichloroisocyanurate, this temperature variation causes the amount of salt dissolved in the mother liquor to fluctuate between 10% and 27% by weight.

The precipitated dichloroisocyanurate is usually washed with water, which results in additional mother liquor that contains dissolved dichloroisocyanurate. After washing, the solids are a high quality dischloroisocyanurate product if the chlorinator feed ratio was about 2.0 moles of base to 1 mole of cyanuric acid.

The improvement provided by this invention is a process by which the dichloroisocyanurate values dissolved in the mother liquor are recovered as product in the form of dichloroisocyanuric acid without interfering with the chlorination reaction. The mother liquor is acidified by contacting it with sufficient strong acid such that the resulting pH is between 1.5 and 4.0. This results in an acidified liquid in which precipitation of the dichloroisocyanurate as the acid takes place. The precipitate is separated and recovered as product while the remaining supernatant liquid is usually discarded. Vigorous agitation is preferred while the strong acid is in contact with the mother liquor.

When sodium dichloroisocyanurate (NaDCC) is the salt in the mother liquor and when the strong acid is concentrated sulfuric acid, dichloroisocyanuric acid (DCCA) is precipitated according to the following exothermic acidification reaction:

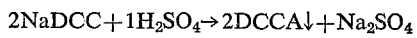

$$2NaDCC + 1H_2SO_4 \rightarrow 2DCCA\downarrow + Na_2SO_4$$

The preferred pH for the reaction is about 2.0.

Since the acidification reaction is exothermic, heat exchangers should be used to prevent temperatures from rising much above 30° C. because decomposition of the dichloroisocyanurate values begins to take place above 30° C., thereby decreasing process efficiency. The preferred operating temperature is between 0° C. and 30° C. with 15° C. being particularly preferred.

The preferred strong acid is about 93% concentrated sulfuric acid; however, any strong acid that is at least 2.0 normal, especially a mineral acid, can be used such as nitric, phosphoric, perchloric or the like. However hydrochloric acid should not be used because it tends to dechlorinate the dichloroisocyanurate values. Acids having a strength of less than 15 normal introduce large quantities of water during neutralization which decreases process efficiency and increases the quantities that must be processed but otherwise does not interfere with the process.

The best mode contemplated for practicing this invention is depicted in the figure. Cyanuric acid, a suitable base and chlorine are reacted in a chlorinator 10 to produce an aqueous slurry 12 containing solid dichloroisocyanuric acid (DCCA). The aqueous slurry is separated in separator 14 into solid dichloroisocyanuric acid 16 and a liquid effluent 18 that is usually discarded. The solid dichloroisocyanuric acid is neutralized in neutralizer 20 with a suitable base; the neutralized effluent is a dichloroisocyanurate slurry 22 which is separated in separator 24 into solid salt 26 and a mother liquor 28 containing dissolved dichloroisocyanurate. The solid salt is washed in washer 30 with water, which results in additional mother liquor 32 containing dissolved dichloroisocyanurate. The mother liquor is acidified with 93% sulfuric acid 34 in an acidification tank 36 to precipitate the dissolved dichloroisocyanurate at a pH of about 2.0 as the dichloroisocyanuric acid. The precipitate is separated in separator 38 (or preferably separator 14) from the acidified mother liquor and the precipitate is mixed with the solid dichloroisocyanuric acid 16 and further processed according to known methods.

The process as depicted in the figure eliminates the recycle flow of mother liquor 28 directly back to the chlorination reactor 10. By eliminating this recycle, the ratio of base to cyanuric acid being fed to the chlorination reaction can be accurately controlled thereby improving product quality and process efficiency. Furthermore, the solid salt can be washed adequately without excessive recycling of mother liquor or significant loss of cyanuric acid values as dissolved salt in the wash water.

The various separations of precipitates from process liquors practiced in this process can be performed by any one of the many known liquid-solid separation methods.

The best mode contemplated is centrifugation. Larger precipitate crystal size increase separation efficiency especially by centrifugation and therefore minimize product loss.

The efficiency of the acidification process varies with the pH of the contents of the acidification tank 36 which pH can be accurately controlled by adjusting the addition of the acid 34 to the acidification tank in response to changes in the pH. The hold-up time of the mother liquor in the acidification tank 36 at the acidification pH affects the crystal size of the precipitate, with large times generally resulting in larger crystals.

The following examples are provided by way of illustration only, and are not intended to limit the scope of this invention.

EXAMPLE I

Ten percent by weight solutions (1, 2, 3, 4 and 5) of sodium dichloroisocyanurate in distilled water were acidified at 10° C. with reagent grade (95–97%) sulfuric acid to pH levels of 3.55, 3.10, 2.50, 2.05 and 1.50 respectively. This acidification required 2.4, 2.5, 2.6, 2.7 and 3.1 milliliters of the sulfuric acid respectively and caused precipitation of dichloroisocyanuric acid (DCCA). The precipitates were each washed with 25 milliliters of 10° C. deionized water and the percent of the sodium dichloroisocyanurate recovered as dichloroisocyanuric acid was determined. The results are given in Table I.

TABLE I

| | pH | Percent DCCA recovered |
|---|---|---|
| Solution: | | |
| 1 | 3.55 | 68.8 |
| 2 | 3.10 | 88.9 |
| 3 | 2.50 | 92.5 |
| 4 | 2.05 | 97.9 |
| 5 | 1.50 | 91.4 |

EXAMPLE II

An 18% by weight aqueous sodium dichloroisocyanurate solution was continuously mixed with reagent grade (95–97%) sulfuric acid and the mixture was continuously fed into a one hour hold-up tank (3,000 milliliters) at the rate of about 50 milliliters per minute. The addition of sulfuric acid was adjusted to maintain the pH of the tank's contents at 2.0. A dichloroisocyanuric acid slurry overflowed the tank and the solids were separated from the slurry. The solid product that was initially recovered (time zero) and the product recovered at 2⅓, 3⅓ and 4⅓ hours of operation were analyzed for crystal size. The results were:

| Time: | Approximate crystal size (microns) |
|---|---|
| 0 | 50×6 |
| 2.33 | 100×15 |
| 3.33 | 150×30 |
| 4.33 | 100×50 |

This compares with a normal crystal size for dichloroisocyanuric acid of about 50×5 microns. The crystal size being the approximate average values for the length and width of the crystals when viewed through a microscope.

We claim:

1. In a process for producing dichloroisocyanuric acid compounds wherein cyanuric acid, a suitable base and chlorine are reacted to produce a first slurry containing chlorinated cyanuric acid, the first slurry is separated in a first separation step into a liquid and a solid containing dichloroisocyanuric acid, the solid dichloroisocyanuric acid is neutralized to produce a second slurry containing dichloroisocyanurate which is separated in a second separation step into solid dichloroisocyanurate and a mother liquor containing dissolved dichloroisocyanurate, wherein the improvement comprises:
   (a) acidifying the mother liquor to a pH of between about 1.5 and about 4.0 with a strong acid thereby forming an acidified mother liquor containing dichloroisocyanuric acid precipitate, and
   (b) separating the precipitate from the acidified mother liquor.

2. The process of claim 1 in which the acidification is with sufficient strong acid selected from the group consisting of sulfuric, nitric, phosphoric, and perchloric acids such that the pH of the acidified mother liquor is about 2.0.

3. The process of claim 1 wherein the mother liquor is maintained at the acidified pH of between about 1.5 and 4.0 for an average hold up time that is regulated between 0.1 and 5.0 hours whereby the precipitate's crystal size is controlled.

4. The process of claim 1 in which the dichloroisocyanurate salt is sodium dichloroisocyanurate and wherein the acidification is accomplished with at least 15 normal sulfuric acid, thereby precipitating dichloroisocyanuric acid.

5. The process of claim 1 wherein the improvement further comprises recycling the acidified mother liquor to the first separation step thereby effectuating the separation of the precipitate from the acidified mother liquor in the first separation step.

6. The process of claim 5 further comprising washing with water the solid dichloroisocyanurate from the second separation step, said washing resulting in mother liquor containing dissolved dichloroisocyanurate, wherein the improvement further comprises: combining the mother liquor obtained from the second separation with the mother liquor obtained from the washing.

7. The process of claim 1 in which neutralization of dichloroisocyanuric acid is carried out with a base selected from the group consisting of sodium hydroxide and potassium hydroxide, and wherein acidification of the resulting dichloroisocyanurate mother liquor is accomplished with a strong acid selected from the group consisting of sulfur, nitric, phosphoric, and perchloric acids such that the pH of the acidified mother liquor is about 2.0.

References Cited

UNITED STATES PATENTS 2,913,460  11/1959  Brown et al. _____ 260—248

JOHN M. FORD, Primary Examiner

UNITED STATES PATENT OFFICE
CERTIFICATE OF CORRECTION

Patent No. 3,758,463        Dated Sept. 11, 1973

Inventor(s) Sidney Berkowitz, et al.

It is certified that error appears in the above-identified patent and that said Letters Patent are hereby corrected as shown below:

Column 1, line 64, "crystals" should read --crystal--.

Column 2, line 24, "results" should read --result--.

Column 4, line 47, "liquid" should read --liquor--.

Column 6, line 52, "sulfur" should read --sulfuric--.

Signed and sealed this 10th day of June 1975.

(SEAL)
Attest:

RUTH C. MASON
Attesting Officer

C. MARSHALL DANN
Commissioner of Patents
and Trademarks